United States Patent [19]

Hucker et al.

[11] Patent Number: 4,467,267

[45] Date of Patent: Aug. 21, 1984

[54] ALTERNATOR EXCITATION SYSTEM

[75] Inventors: David J. Hucker, Rockford, Ill.; Norbert L. Schmitz, Middleton, Wis.

[73] Assignee: Sundstrand Corporation, Rockford, Ill.

[21] Appl. No.: 462,017

[22] Filed: Jan. 28, 1983

[51] Int. Cl.³ .......................... H02P 9/10; H02P 9/30
[52] U.S. Cl. ....................................... 322/61; 322/63; 322/87
[58] Field of Search ...................... 322/59, 61, 63–66, 322/86–88

[56] References Cited

U.S. PATENT DOCUMENTS

| | | | |
|---|---|---|---|
| 3,070,740 | 12/1962 | Chirgnin et al. | 322/61 X |
| 3,649,903 | 3/1972 | Fiedler | 322/88 X |
| 4,035,713 | 7/1977 | Kawamoto et al. | 322/87 X |
| 4,336,486 | 6/1982 | Gorden et al. | 322/87 X |

Primary Examiner—R. J. Hickey
Attorney, Agent, or Firm—Wood, Dalton, Phillips, Mason & Rowe

[57] ABSTRACT

An excitation system for a brushless synchronous alternator includes an exciter having a stator which includes first and second sets of field coils respectively coupled to a source of DC power and in series with polyphase AC output current developed by the main generator. A base level of exciter field current is provided by the DC current delivered to the first set of field coils while a second variable amount of field current is provided by the AC output current delivered to the second set of field coils. The exciter also includes a rotor structure having first and second sets of armature windings which develop first and second exciter currents in response to movement of the rotor structure within the magnetic fields set up by the first and second sets of exciter field coils. The first and second exciter currents are added, rectified and delivered to a set of main generator field windings. By dividing the responsibility for providing exciter field current in this fashion, transient response is improved and overall length and weight of the generator package are decreased.

20 Claims, 11 Drawing Figures

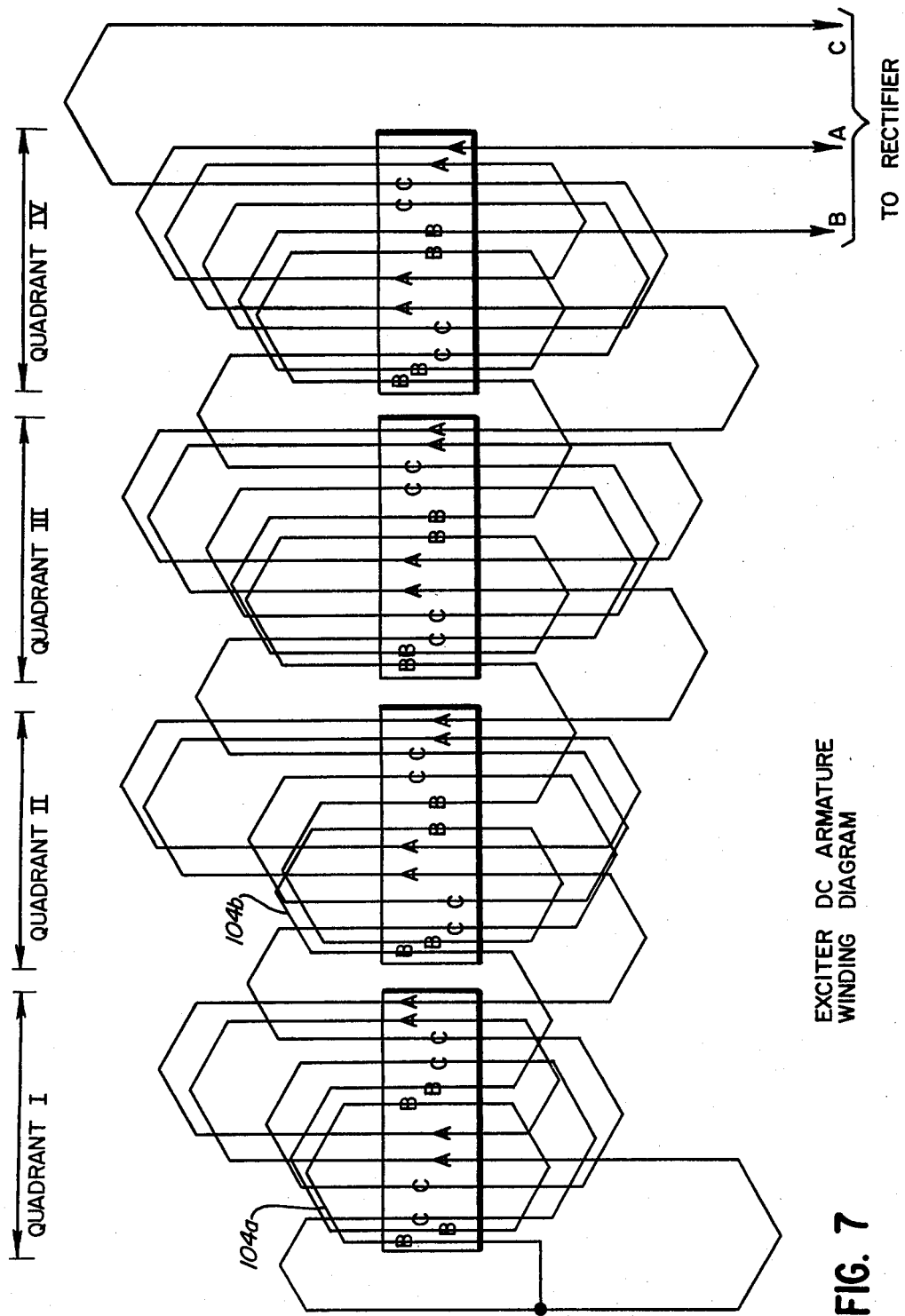

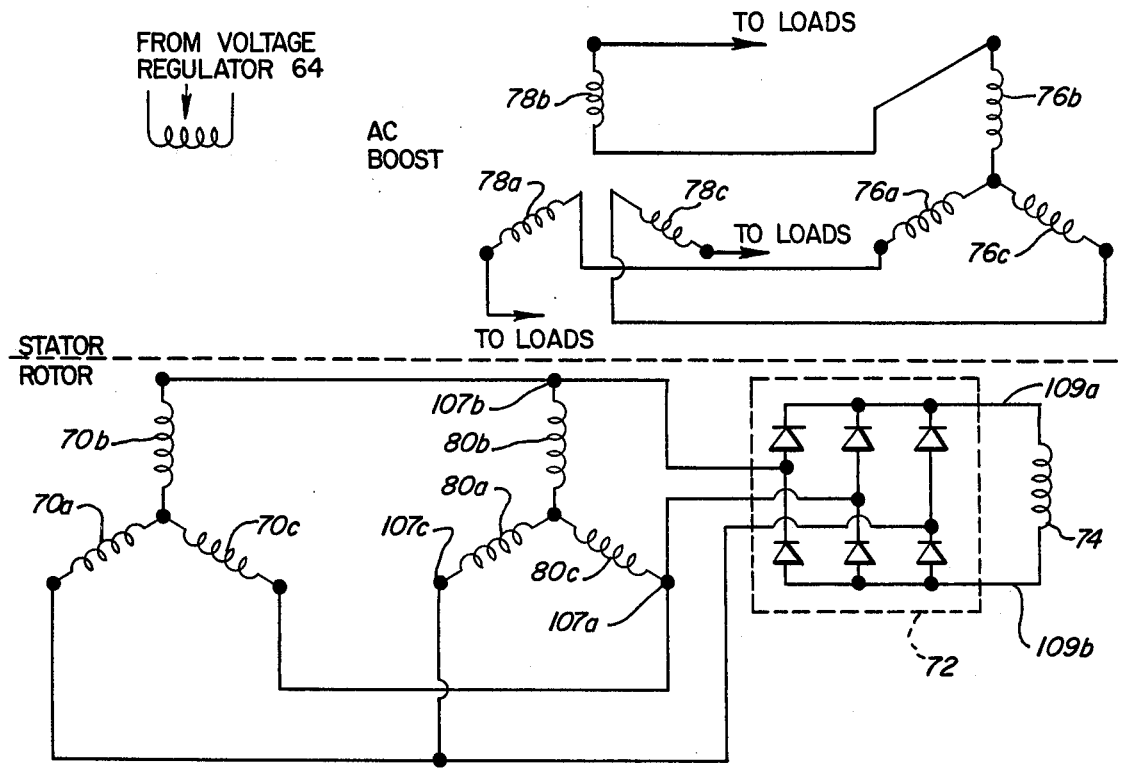
FIG. 9
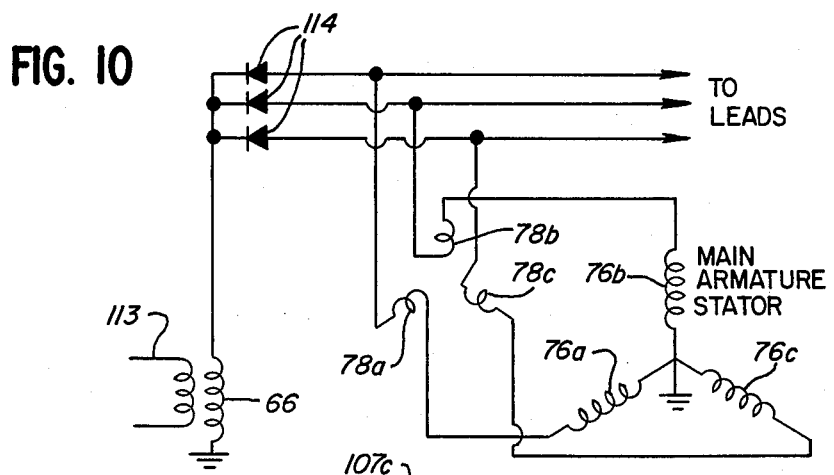
FIG. 10
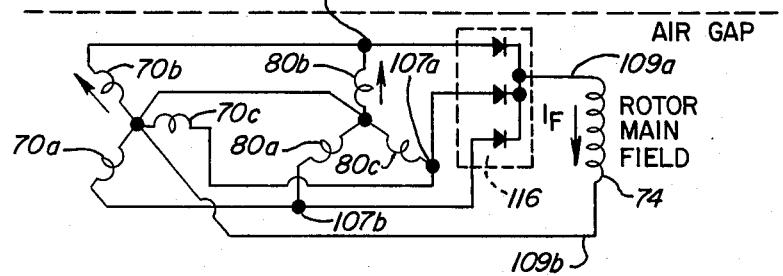

ALTERNATOR EXCITATION SYSTEM

DESCRIPTION

1. Technical Field

The present invention relates generally to generating systems, and more particularly to an excitation system for a brushless alternator.

2. Background Art

In prior types of brushless alternator excitation systems, such as that shown in Mishima et al U.S. Pat. No. 3,863,137, an exciter for providing main field current for a main generator includes a double field winding structure having first and second field windings. One of the field windings receives power from a voltage regulator-controlled rectifier coupled to a permanent magnet generator (or PMG), while the other winding receives DC current from a rectifier coupled to the generator output such that a current proportional to load current is supplied thereto.

Other patents disclosing similar dual field winding excitation systems wherein both windings receive DC excitation current include Roche U.S. Pat. No. 4,117,388, Harter U.S. Pat. No. 3,771,046, Barrett et al U.S. Pat. No. 3,281,649 and Churilow U.S. Pat. No. 3,130,360.

The generator excitation systems described above suffer from various disadvantages. There is a requirement in these systems that the signal from the generator output must be rectified before being applied to the exciter field windings. Consequently, phase information at the output of the generator is lost and hence the signal delivered to the exciter field windings from the output of the generator is independent of load power factor. It has been found that the exciter field current necessary to satisfy main generator output requirements is a function of load power factor. As a result, in these prior systems the field current required to cancel load power factor effects must be supplied by the PMG and voltage regulator, in turn requiring these components to be unduly large and/or complex. Further, these prior systems are limited in their ability to achieve fast transient response times due to the above-noted loss of phase information. Also, the AC to DC conversion between the main generator output and the field windings requires the use of rectifier circuits, thereby adding to the cost and weight of these systems.

DISCLOSURE OF THE INVENTION

In accordance with the present invention, an excitation system for a brushless, synchronous alternator includes a dual winding exciter structure for developing first and second exciter signals which are combined, rectified and coupled to the field windings of a main generator. The main generator includes armature windings which develop polyphase AC output signals to drive one or more loads.

A first set of exciter field windings receives a base level of DC current from a voltage regulator and rectifier coupled to the armature of a permanent magnet generator, or PMG. A second set of exciter field windings is connected in series with the armature windings of the main generator so that the second set of exciter windings receive the load current. The currents in first and second exciter field windings establish first and second exciter magnetic fields through which the first and second sets of exciter armature windings move. The number and position of the sets of exciter field and armature windings are selected so that the resultant exciter armature currents induced in the first and second sets of exciter armature windings are of the same frequency. The exciter armature currents are added and coupled to a polyphase rectifier which converts these currents into a DC current for energizing the main generator field winding.

Such an excitation system provides the correct amplitude and phase angle relationships for good tracking of the main generator excitation requirements. Since transient regulation is provided by the AC exciter, the demands placed upon the voltage regulator are diminished. Moreover, the PMG length and weight may be decreased, since only a base level of exciter current is required to be supplied thereby.

BRIEF DESCRIPTION OF THE DRAWINGS

FIGS. 7 and 8 are winding diagrams showing the layout of DC and AC windings for the exciter rotor shown in FIGS. 4 or 5;

FIG. 9 is a schematic diagram of the excitation system of the present invention; and FIG. 10 is a schematic diagram of an alternative excitation system.

BEST MODE FOR CARRYING OUT THE INVENTION

Figure 1:
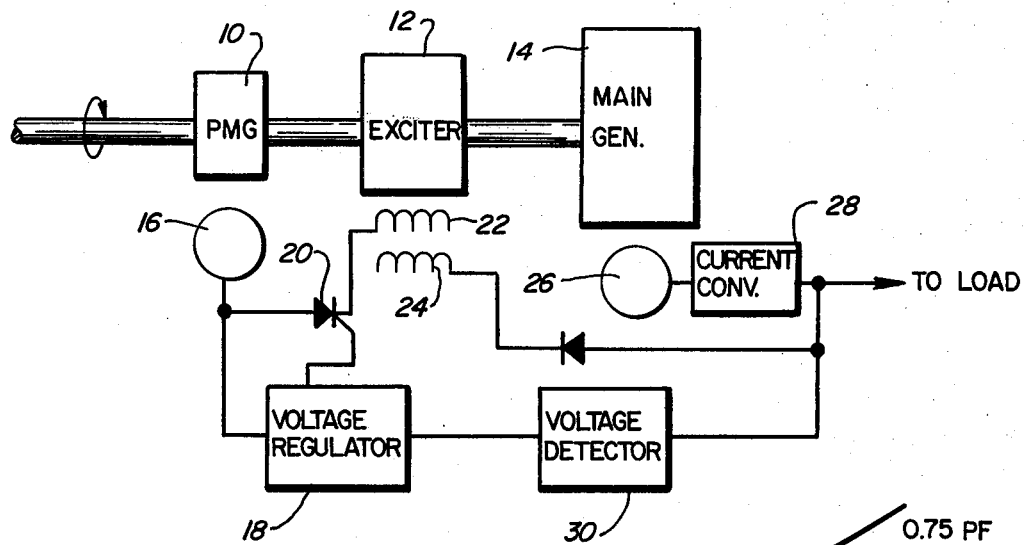
FIG. 1 is a block diagram of a prior art excitation system for a generator.

Referring to FIG. 1, there is illustrated a dual winding excitation system for a brushless alternator as disclosed in Mishima et al U.S. Pat. No. 3,863,137. A rotary shaft is coupled to and drives a permanent magnet generator (or PMG) rotor 10, an exciter rotor 12 and a main generator rotor 14. The PMG rotor 10 is a magnetic structure developing a magnetic field which rotates relative to a stationary set of PMG windings 16, in turn causing a voltage to appear therein. The voltage is applied to a voltage regulator 18 which in turn controls the firing of an SCR 20 to deliver DC current to a first exciter field winding 22. A second exciter field winding 24 receives a rectified voltage from a set of main generator stator windings 26 via a current converter 28.

The output voltage from the current converter 28 delivered to the load is monitored by a voltage detector 30, which in turn controls the firing of the SCR 20 through the voltage regulator 18 to provide exciter field current even in the event of a short circuit of the main generator output.

Figure 2:
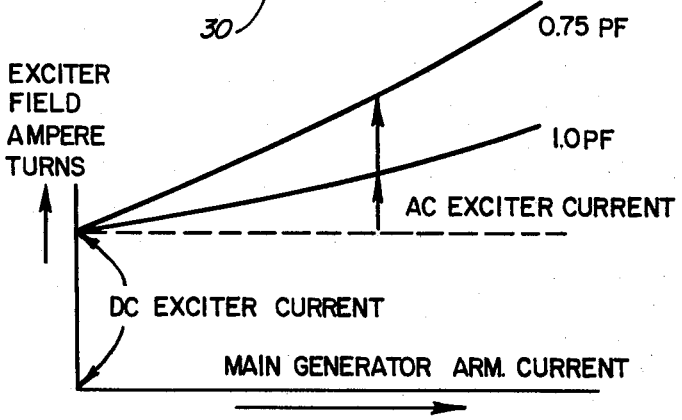
FIG. 2 is a graph depicting main generator armature current versus exciter field ampere-turns for power factors of unity and 0.75, respectively.

Referring now to FIG. 2, there is shown a normalized graph illustrating the relationship between main generator armature or output current versus exciter field ampere-turns for load power factors of unity and 0.75. It can be seen that a greater magnitude of exciter field current is required for a particular main generator output current drawn by a load when the load power factor is 0.75 as opposed to when the load power factor is unity. In other words, the exciter field current (or expressed equivalently as ampere-turns in FIG. 2) is a function of the load power factor for a particular main generator output current. In prior types of excitation systems, such as that described above in connection with FIG. 1, the current delivered to the exciter field coil 24 from the main generator output is not dependent upon load power factor. Hence, additional current required to maintain the exciter field at the proper level in response to changes in load power factor must be supplied by controlling the firing angle of the SCR 20. Consequently, the voltage regulator 18 and voltage detector 30 assume substantially the entire burden of responding to transients in the main generator output due to changing load power factor. Since these circuits have inherent operational delays associated therewith, transient response of the overall alternator system is limited. Hence, in order to achieve fast response times, the voltage regulator and the voltage detector must be complex and expensive.

Further, the PMG 10 must be capable of supplying a large amplitude of current in response to transients, and hence the size and weight of the PMG rotor structure 10 and winding 16 must be unduly large.

To overcome the above problems, the excitation system of the present invention divides the responsibility for providing exciter field current into two parts. A first DC field current is delivered to a first field coil to establish a first magnetic field. This current is provided by a permanent magnet generator and voltage regulator which supply a base level of exciter field current at all times. The variable remaining portion of exciter field current necessary to satisfy main generator output requirements in response to changes in load power factor is supplied by AC current delivered from the output of the main generator to a second field coil to establish a second magnetic field. Two sets of exciter armature coils are rotated within the first and second magnetic fields and develop first and second exciter currents which are combined and coupled to the main generator field coil.

By utilizing the AC current delivered to the load to satisfy the varying exciter field current requirements dependent upon load factor, transient response is improved over systems known in the prior art. Further, since the PMG need only provide a base level of current for the exciter field, the size and weight of the PMG can be reduced. Also, since the voltage regulator need not be capable of fast transient response, this circuit can be simple and inexpensive.

Figure 3:
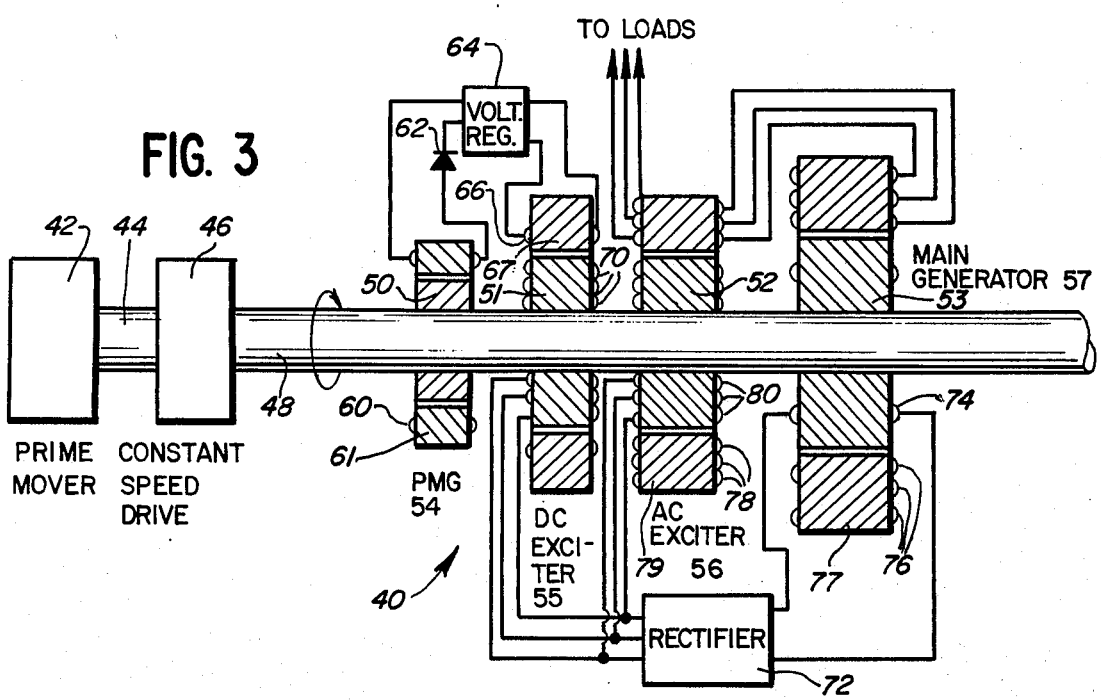
FIG. 3 is a diagrammatic sectional view of an exciter structure for a synchronous, brushless alternator according to the present invention.

Referring now to FIG. 3, there is illustrated a first embodiment of an excitation system 40 according to the present invention. A prime mover 42 has an output shaft 44 coupled through a constant speed drive 46 with a drive shaft 48. The constant speed drive 46 converts the variable speed rotary motion of the output shaft 44 into constant speed rotary motion of the drive shaft 48. The drive shaft 48 has mounted on it a plurality of rotor structures 50–53 of a permanent magnet generator or PMG 54, a DC exciter 55, an AC exciter 56 and a main generator 57, respectively.

The rotor structure 50 of the PMG 54 includes a plurality of magnets on the shaft 48 which move relative to coils 60 disposed within a stator 61 of the PMG 54. The currents induced in the coils 60 are rectified by a rectifier 62 and delivered to a voltage regulator 64 which in turn couples the rectified and regulated DC field current to a first set of field coils 66 disposed within a stator 67 of the DC exciter 55. The current flowing through the coils 66 establishes a magnetic field in the space occupied by a first set of exciter armature coils 70a–70c, FIG. 10, disposed with the rotor structure 51 of the DC exciter 55. Rotation of the shaft 48 and coils 70a–70c within the magnetic field set up by the coils 66 causes a first set of exciter currents to be induced in the coils 70a–70c.

The coils 70a–70c are coupled to a rectifier circuit 72. While the rectifier circuit 72 has been shown for purposes of clarity as being separate from the rotor structures coupled to the shaft 48, it should be understood that the circuit 72 is mounted on the shaft 48 and moves therewith. The output of the rectifier circuit 72 is coupled to a main generator field coil 74 disposed within the main generator rotor structure 53. The current delivered to the main field coil 74 in turn sets up a main generator magnetic field in the spaced occupied by a series of main generator armature or output coils 76a–76c disposed in a stationary stator 77 of the main generator 57. Movement of the main generator magnetic field relative to the coils 76a–76c causes three phase AC output current to be developed in the coils 76. The AC output current may be used to energize one or more loads.

It should be noted that the invention is not limited to three-phase alternators. Any number of phases, including single phase, may be provided at the output of the main generator 57.

A second set of exciter field coils or windings 78a–78c are disposed in a stator 79 of the AC exciter 56 and are coupled in series between the main generator armature coils 76a–76c and the loads to be driven thereby. The current flowing through the coils 78a–78c in turn establishes a second exciter magnetic field in the space occupied by a second set of exciter armature coils 80a–80c disposed within the AC exciter rotor structure 52. As the AC rotor structure 52 rotates within the second magnetic field established by the coils 78a–78c, a set of second exciter currents are developed in the coils 80. The first and second sets of exciter currents are combined and coupled to the rectifier circuit 72 to establish the magnetic field set up by the main generator field coil 74.

Figure 4A:
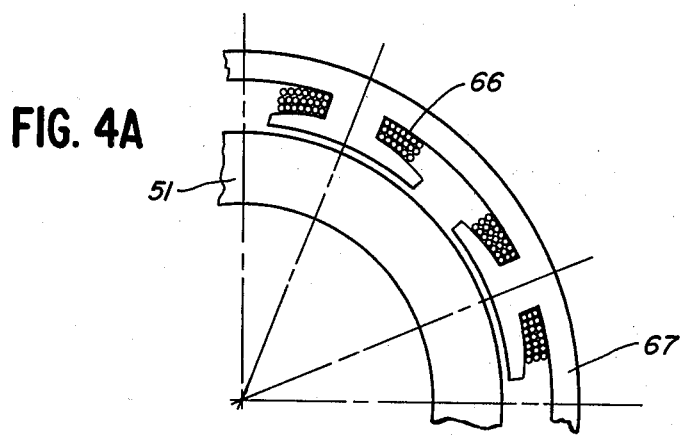
FIGS. 4A and 4B are diagrammatic fragmentary sectional views of the DC and AC exciter structures, respectively, shown in FIG. 3.
Figure 4B:
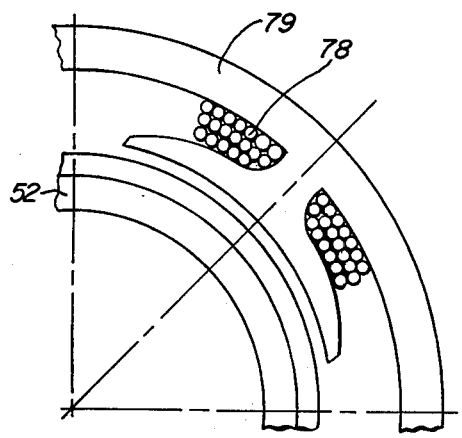

Referring also to FIGS. 4A and 4B, there is illustrated the structure of the DC and AC exciters 55, 56, respectively. The DC and AC exciters each contain a number of poles, with the number of poles in each being selected so that the frequencies of the first and second sets of exciter signals induced in the DC and AC exciter armature coils 70, 80 are equal. The first and second exciter currents can be combined to obtain the correct amplitude and phase angle relationships for good tracking of the main generator excitation requirements. The number of poles for the DC and AC exciters are determined in accordance with the following equations:

$$f_{DC} = \frac{N_s P_{DC}}{120} \quad (1)$$

where $f_{DC}$=frequency of signal developed in DC exciter armature windings 70 by the first exciter (i.e. DC) magnetic field,
$N_s$=speed in rpm of shaft 48
$P_{DC}$=number of poles of DC exciter stator $$f_{AC} = (N_s \pm N_{\phi AC}) \frac{P_{AC}}{120} \qquad (2)$$

where
$N_{\phi AC}$=speed in rpm of AC rotational flux
$P_{AC}$=number of poles of AC exciter
Also:

$$N_{\phi AC} = \frac{120 f_{gAC}}{P_{AC}} \qquad (3)$$

where $f_{gAC}$=generator output frequency
Substituting (3) into (2) and setting (1) and (2) equal:

$$f_{DC} = f_{AC} = \frac{N_s P_{AC}}{120} + f_{gAC} = \frac{N_s P_{DC}}{120}$$

Rearranging and solving for $(P_{DC}-P_{AC})$:

$$P_{DC} - P_{AC} = \pm f_{gAC} \frac{120}{N_s} \qquad (4)$$

In the illustrated embodiment, the main generator is a four pole system which operates at 12,000 rpm shaft speed. Accordingly, the output of the main generator has a frequency of 400 hz. By substituting into equation (4) above, one can determine the number of AC poles relative to the number of DC poles in the exciter as follows:

$$P_{DC} - P_{AC} = \pm 400 \frac{120}{12,000} = \pm 4$$

Therefore the number of poles in the DC exciter differs from the number of poles in the AC exciter by four.

As seen in FIGS. 4A and 4B, there are eight pole elements in the DC exciter stator 67 and four pole elements in the AC exciter stator 79. As is evident from the above discussion, any other number of DC and AC poles may be used as long as the difference between the number of these poles is equal to four.

The exciter structure described above in connection with FIG. 3 incorporates separate exciter structures comprising the DC exciter 55 and the AC exciter 56. It is possible, and in fact preferred, to combine the DC and AC exciter poles in a single unitary exciter structure 90, shown in FIGS. 5 and 6.

The structure 90 will be described for the example in which the shaft speed $N_s$ is 12,000 rpm and the frequency of the generator $f_{gAC}$ is 400 hz. Accordingly, the difference between the number of AC and DC poles is four as determined by the equations (1)-(4) above.

Figure 6:
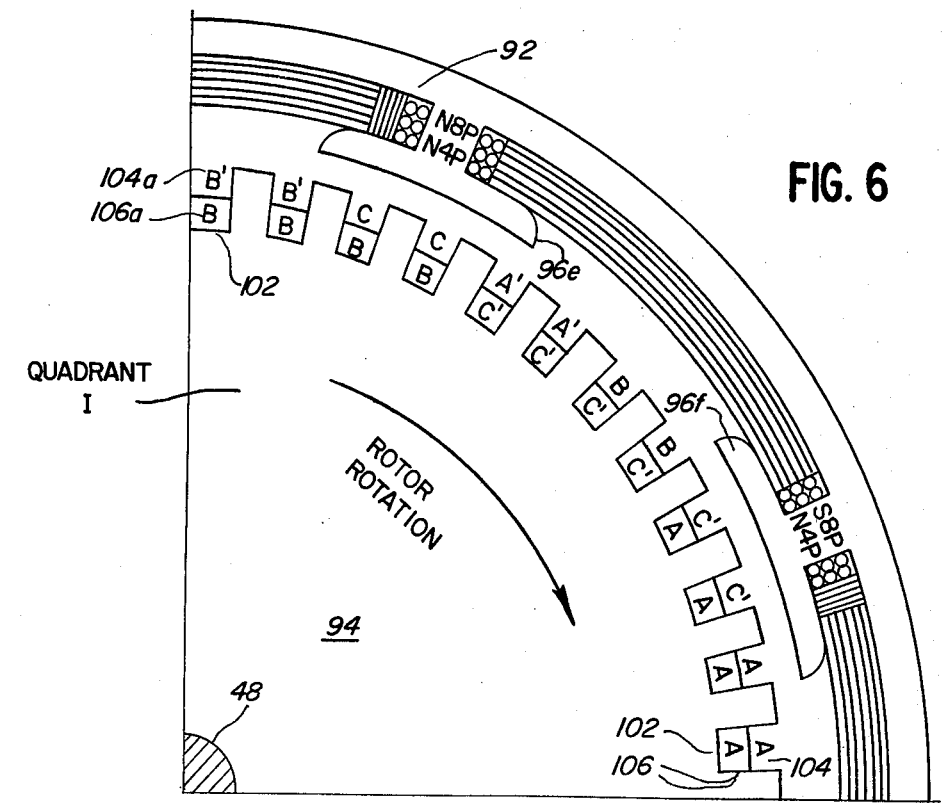
FIG. 6 is a fragmentary diagrammatic view similar to FIGS. 4A and 4B of the combined exciter structure shown in FIG. 5.
Figure 5:
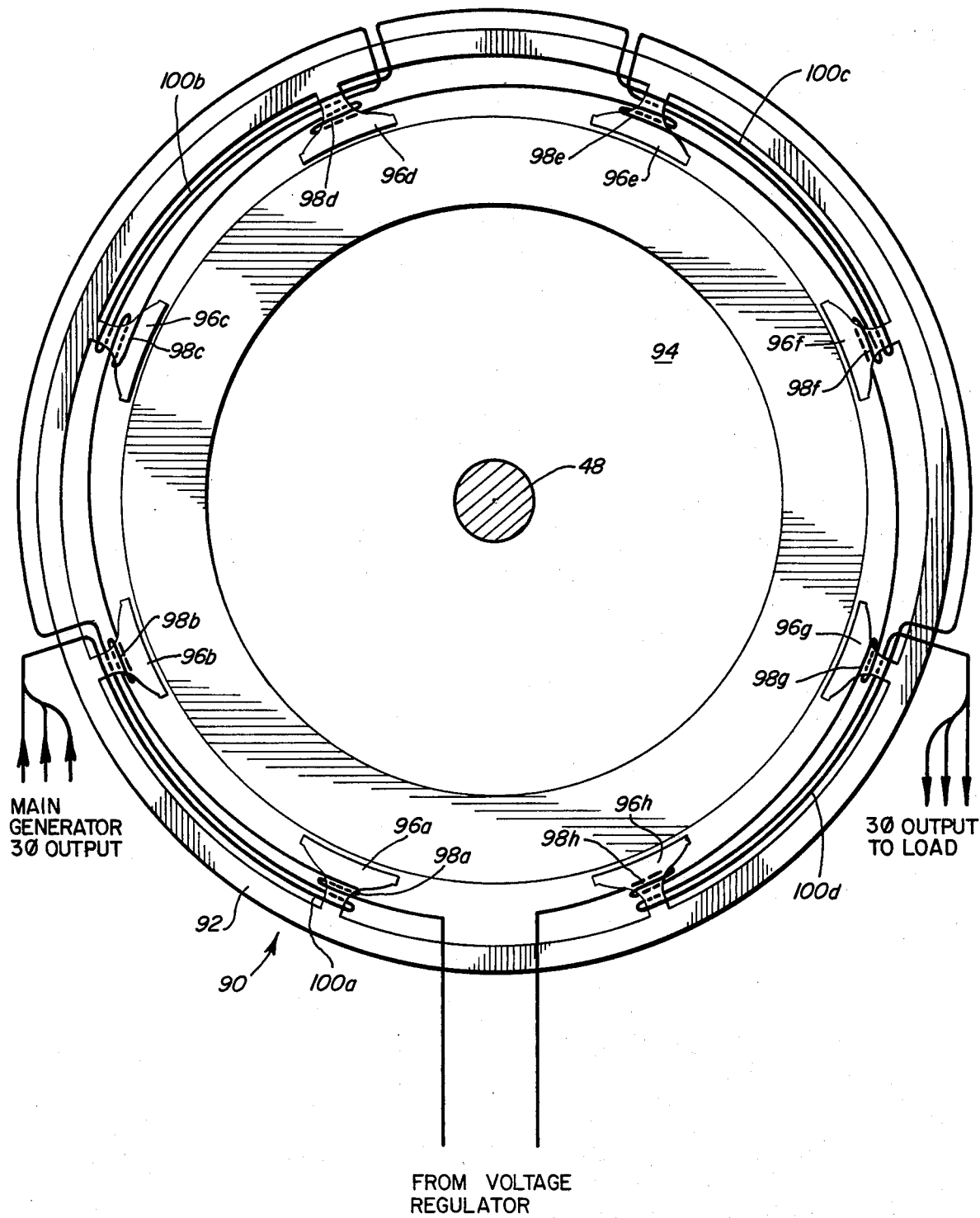
FIG. 5 is a sectional view showing a preferred combined DC and AC exciter structure according to the present invention.

As seen in FIGS. 5 and 6, the unitary exciter structure 90 includes a stator 92 disposed about a rotor 94 driven by the shaft 48. The stator 92 has a series of eight pole elements 96a-96h. Wound about each of the pole elements 96a-96h is a DC winding 98a-98h, respectively, which together comprise the DC field coil 66. The windings 98 receive DC current from a source of DC current such as the voltage regulator 64 shown in FIG. 2. Each winding 98 is wound in an opposite direction as compared with those immediately adjacent the winding, e.g. the winding 98a is wound in a clockwise fashion as viewed from the center of the stator 92 and rotor 94 while the windings 98a and 98h are wound in counterclockwise fashion. Accordingly, the pole elements 96 comprise DC poles which present alternating north and south magnetic fields directed toward the space occupied by the rotor 94.

Disposed about respective pairs of the pole elements 96 is a series of four AC windings 100a-100d which are connected to the polyphase output of the main generator 57 and which together comprise the AC exciter field coils 78a-78c. While the windings 100 are shown for purposes of clarity as a single conductor, it should be understood that the windings 100 include three conductors comprising three individual phase windings which are coupled in series with the three output lines from the main generator 57.

Each of the windings 100 is wound in opposite directions as compared with those immediately adjacent thereto. For example, the winding 100a is wound in a counterclockwise direction about the pole elements 96a and 96b as viewed from the center of the stator 92 and rotor 94, while the winding 100b is wound in a clockwise direction about the pole elements 96c,96d. Further, the winding 100c is wound in a counterclockwise direction about the pole elements 96e,96f while the winding 100d is wound in clockwise fashion about the pole elements 96g,96h. It can therefore be seen that there are four AC poles disposed in the stator 92 superimposed over the eight DC poles.

It should be noted that in the case of separate AC and DC exciters as shown in FIGS. 4A and 4B, the windings 98 and 100 are wound in exactly the same way as described above, with each AC pole element of the AC exciter 56 taking the place of the pairs of pole elements disposed in the stator 92 of the unitary exciter structure.

Referring specifically to FIG. 6, the rotor 94 of the exciter structure 90 includes a plurality of slots 102 within which are disposed windings 104,106 comprising the first and second sets of armature coils 70,80, respectively. Three phase alternating current is induced in the windings 104,106 by movement of the rotor 94 in the magnetic fields developed by the DC and AC coils 78,80 of the stator 92, as previously noted.

Figure 8:
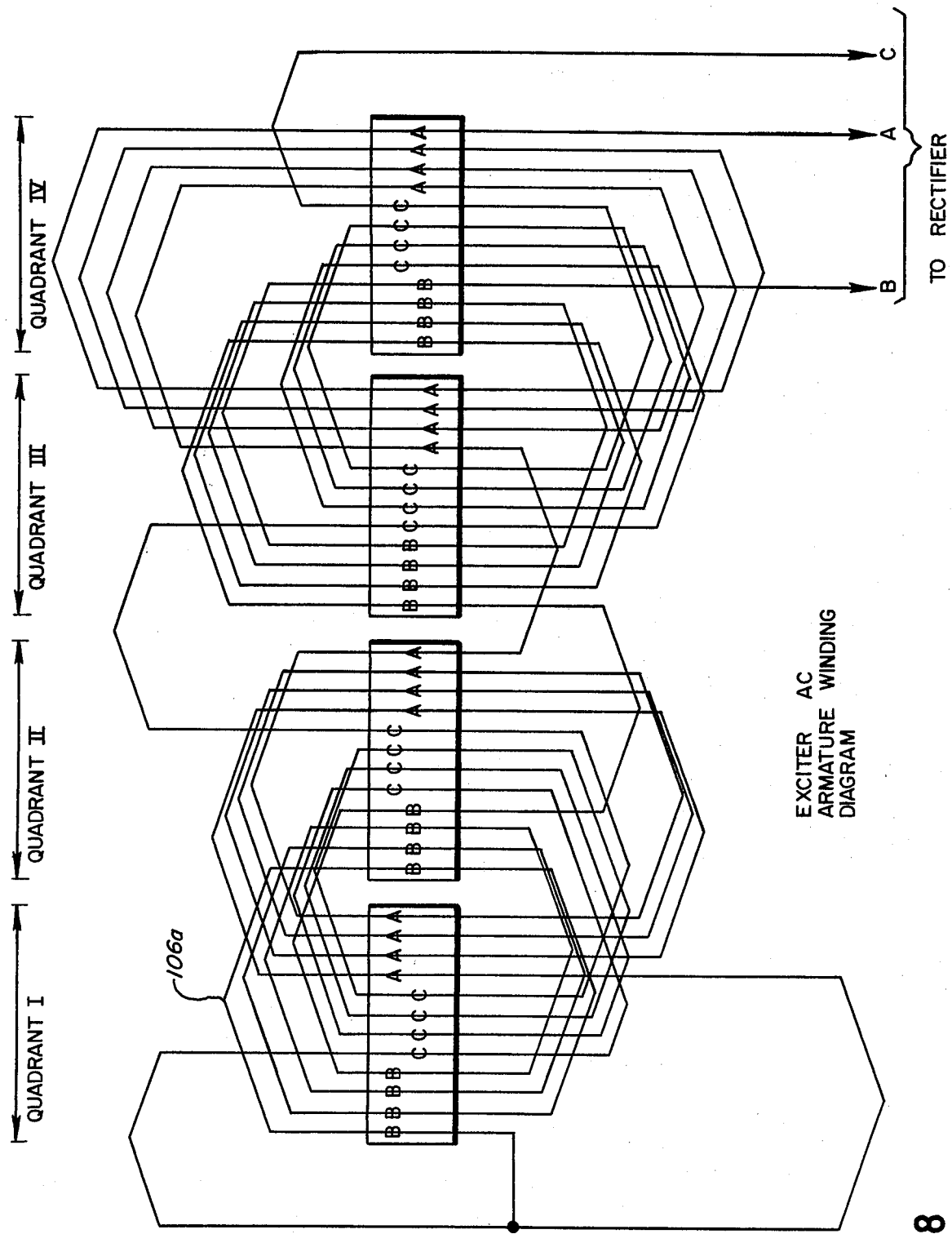

Referring now to FIGS. 7 and 8 there are illustrated winding diagrams for the DC and AC rotor windings 104,106. The winding diagrams shown in FIGS. 7 and 8 apply not only to the unitary exciter structure shown in FIGS. 5 and 6, but also to the separate exciter structures shown in FIGS. 3 and 4. In the latter case, the rotor 51 of the DC exciter 55 has slots having the windings 104 disposed therein while the rotor 52 of the AC exciter 56 has slots having the windings 106 disposed therein.

Referring to FIG. 7, the windings 104 in the DC portion of the exciter (whether the DC exciter 55 or the unitary exciter structure 90) are shown for each quadrant, labelled quadrants I-IV, wherein quadrant I begins at the 12 o'clock position for the stator shown in FIG. 5 and wherein the quadrants are numbered in clockwise fashion. The letter designations in FIG. 6 represent the three phases of the alternating current output from the rotor windings 104,106 and the prime designation associated with the letters represent winding directions opposite to those letters not having a prime designation associated therewith.

As seen in FIG. 7, the coils 70a–70c are connected together at a common junction 108. Each rotor quadrant consists of two poles with each pole having six slots within which are disposed the windings 104 for each of the three phases of the exciter DC armature. Each coil 70a–70c comprises a distributed wave winding, although other winding arrangements can be used.

The ends of the coils opposite the junction 108 are coupled to the rectifier 72 as shown in FIG. 3.

Referring also to FIG. 8, the coils in the AC exciter rotor are similarly coupled together at a common junction 110, however each quadrant of the rotor structure 52 or 94 comprises a single pole containing twelve slots within which is disposed the winding 106. As was noted with respect to the DC armature windings, the AC armature windings are distributed wave windings. The ends of the coils 80a–80c opposite the junction 110 are coupled to similarly lettered phases of the coils 70a–70c such that the first and second exciter armature currents are added before being rectified in the rectifier circuit 72.

Referring now to FIG. 9, there is illustrated a schematic diagram of the excitation system according to the present invention. The system may be that shown in FIG. 3, or may be one that utilizes the unitary exciter structure 90 shown in FIGS. 4 and 5.

The currents flowing in the coils 70a–70c are added to the currents flowing in the coils 80a–80c at junctions 107a, 107b, 107c, respectively, and are delivered to the three phase full wave rectifier 72. The rectified signal is then connected to the field coil 74 of the main generator 57 through conductors 109a, 109b. The field coil 74 sets up a magnetic field which rotates relative to the stator of the main generator 57 which contains the main generator output or armature coils 76a–76c. Currents are induced in the coils 76 which are delivered to the load through the coils 78a–78c. The currents through the coils 78 in turn set up a magnetic field for the coils 80a–80c in the AC rotor structure, which is moving with respect to this magnetic field. It should be noted that the impedance of the coils 78 is low compared to the impedance of the loads connected thereto, and consequently the currents flowing through the coils 78 are substantially determined only by the load connected thereto. While transient response cannot be made perfect due to the non-zero impedance of the windings 78, it has been found that transient response can be improved significantly by utilizing this feedback scheme.

It should be noted that in the case of the unitary exciter structure 90, the superimposed AC and DC rotor windings operate functionally independent of one another. Referring to FIGS. 6 and 8, if one visualizes only one winding 109 of the coil 80b, this coil links all of the flux from the pole, designated N4P (meaning North four pole), comprising the pole elements 96e, 96f of the AC structure. Consequently, a voltage is induced in this coil proportional to the rate of change of flux linkages when there is relative motion between the field structure and the winding.

It can also be seen that the winding 109 links adjacent north and south poles 96e, 96f (designated N8P and S8P) of the DC structure and hence the total flux linkages between these poles and the winding is zero. Consequently, the DC component of the exciter field does not interact with the AC armature coils 80.

Further, as seen in FIGS. 6 and 7, when one considers a typical winding 104a of the DC rotor coil 70, it can be seen that this winding links all of the flux from the DC pole 96e. Consequently, a voltage is induced in this winding. However, this voltage is cancelled by the voltage induced in a winding 104b which links the flux from an opposite pole in a corresponding position in the second quadrant. Accordingly, it can be seen that the voltage induced in the DC armature coils 70 is solely the result of movement of the DC coils 70 in the magnetic field established by the DC current flowing in the DC field coil 66.

Referring now to FIG. 10, there is shown a schematic diagram of an alternative circuit. The primary difference of this circuit over that shown in FIG. 9 lies in the fact that the DC exciter field coil 66 receives DC current not from the PMG and voltage regulator shown in FIG. 2, but receives DC current from rectifiers 114 coupled to the three phase output of the main generator through the AC exciter field coil 78. In this case, the current delivered to the DC exciter field coil 66 is proportional to the current drawn by the load. Consequently, field current for the DC field coil 66 is provided from the generator output, and hence the PMG 54 shown in FIG. 2 need not be a source of DC current in this regard.

A further difference of FIG. 10 over the system shown in FIG. 9 is that a trim coil 113 may be disposed adjacent to the DC field coil 66 and coupled to and controlled by a voltage regulator which receives power from a PMG or other source of electrical power. The trim coil 113 is used to control the current flowing in the DC field coil 66 such that it responds in a particular fashion to transients in the signal delivered to the load. Consequently, instead of supplying an essentially constant base level of current for the exciter field, the coil 66 may follow long term transients in the generator output signal to improve steady state accuracy, while short term transients are handled by the AC exciter coils 78.

Other differences over the system shown in FIG. 9 is that the main generator field coil 74 is coupled across a half wave rectifier 116, which is substituted for the full wave rectifier 72, and the common node of the coils 70a–70c and 80a–80c.

Either of the excitation systems shown in FIG. 9 or FIG. 10 results in a net savings in length and weight of the entire generator package since the permanent magnet generator length and weight can be reduced. Further, the excitation system affords better transient response than systems previously known, while at the same time being less complex and expensive.

We claim:

1. In an alternator driven by a source of motive power for energizing a load having an exciter for developing an exciter output current, a main generator coupled to the load and to the exciter for developing output currents from the exciter output current, means including a source of direct current for establishing an exciter field, each of the exciter and main generator having a moving rotor assembly coupled to the source of motive power and a stationary stator disposed adjacent the rotor with the rotor assembly and stator having conductors disposed thereon forming field and armature coils, the improvement comprising:

the exciter field coils include first and second sets of field windings wherein the first set of field windings is coupled to the source of direct current to establish a first portion of the exciter field and wherein the second set of field windings is coupled to the main generator output signals to establish a second portion of the exciter field; and the exciter armature coils include first and second sets of armature windings wherein a first armature current is induced in the first set of armature windings as a result of movement of the exciter rotor in the first portion of the exciter field and wherein a second armature current is induced in the second set of armature windings as a result of movement of the exciter rotor in the second portion of the exciter field, the first and second armature currents being combined to form the exciter output current.

2. The improvement of claim 1 wherein the second set of field windings is coupled in series between the main generator and the load.

3. The improvement of claim 1 wherein the main generator develops three phase alternating current at a main generator output, and wherein the second set of field windings includes three windings coupled between the main generator output and the load.

4. The improvement of claim 1 wherein the source of direct current includes a permanent magnet generator coupled to the source of motive power for developing a PMG current, means for rectifying the PMG current and means for coupling the PMG current to the first set of exciter field windings to establish the first portion of the exciter field.

5. The improvement of claim 4 wherein the current in the first set of field windings remains essentially constant regardless of transient conditions in the main generator output signals, and wherein the second armature current is variable in response to transients in the main generator output signals.

6. The improvement of claim 1 wherein the source of direct current includes a rectifier coupled to the main generator output signals for developing rectified currents which are coupled to the first set of field windings to establish the first portion of the exciter field.

7. The improvement of claim 6 further including a trim coil disposed adjacent the first set of field windings for controlling the amount of current therein.

8. The improvement of claim 6 wherein the current in the first set of field windings varies only as a function of long term transients in the main generator output signal and wherein the current in the second set of field windings varies as a function of short term transients in the main generator output signal.

9. The improvement of claim 1 wherein the rotor includes slots and wherein the first and second sets of armature windings are both disposed within the slots adjacent one another.

10. The improvement of claim 1 wherein the exciter stator includes a plurality of pole elements and wherein the first set of field windings includes windings disposed about each of the pole elements to form a first set of poles and the second set of field windings includes windings disposed about pairs of pole elements to form a second set of poles.

11. The improvement of claim 10 wherein each pole of the first and second sets of poles has a polarity opposite the polarity of adjacent poles of the same set, and wherein each pole of the second set comprises adjacent pole elements of the exciter stator.

12. The improvement of claim 11, wherein the second set of armature windings links the magnetic flux from adjacent opposite poles of the first set such that no voltage is induced in the second set of armature windings by the first portion of the magnetic field.

13. The improvement of claim 11 wherein the first set of armature windings links the magnetic flux from adjacent opposite poles of the second set such that no voltage is induced in the first set of armature windings by the second portion of the magnetic field.

14. The improvement of claim 1 wherein the exciter includes separate AC and DC exciter portions each having a stationary stator and a moving rotor, the first set of field windings and the first set of armature windings being disposed on the stator and the rotor of the DC exciter portion, respectively, and the second set of field windings and the second set of armature windings being disposed on the stator and rotor of the AC exciter portion, respectively.

15. The improvement of claim 14, wherein the main generator develops polyphase alternating current at a main generator output, and wherein the AC exciter portion includes a plurality of poles about which the second set of field windings are disposed, the second set of field windings being coupled in series between the main generator output and the load such that the polyphase alternating current establishes the second portion of the exciter field.

16. An excitation system for a brushless alternator driven by a source of motive power, comprising:

a main generator for developing output currents having field and armature coils, one of the field and armature coils being driven by the source of motive power such that the field and armature coils move relative to one another;

an exciter having first and second sets of field windings and first and second sets of armature windings;

a source of direct current coupled to the first set of field windings for establishing a first exciter magnetic field in the space occupied by the first set of armature windings;

means for coupling the second set of field windings to the output currents from the main generator armature coils to establish a second exciter magnetic field in the space occupied by the second set of armature windings;

means for coupling the exciter to the source of motive power to move both sets of exciter armature windings and the exciter magnetic fields relative to one another to develop first and second exciter armature currents in the first and second armature windings, respectively;

means for combining the first and second exciter armature currents; and means for coupling the combined first and second exciter armature currents to the main generator field coil.

17. An excitation system for a brushless alternator for energizing a load and driven by a source of motive power, comprising:

a main generator having a rotor, a stator, a set of armature coils on the stator, a field coil for establishing a main generator magnetic field in a space occupied by the set of main generator armature coils and means for coupling the main generator rotor to the source of motive power such that the main generator magnetic field moves relative to the set of armature coils to develop main generator polyphase AC output currents in the set of armature coils;

a source of direct current;

an exciter having a first set of exciter field windings coupled to the source of direct current to establish a first exciter magnetic field, a second set of exciter field windings coupled in series between the main generator armature coils and the load to establish a second exciter magnetic field, a first set of exciter armature coils within the first exciter magnetic field, a second set of exciter armature coils within the second exciter magnetic field, the coupling means also coupling the exciter to the source of motive power such that the first and second sets of exciter armature coils move relative to the first and second exciter magnetic fields to develop first and second exciter armature currents in the first and second exciter armature coils, respectively;

means for combining the first and second exciter armature currents to develop a combined exciter armature current;

means for rectifying the combined exciter output current; and means for connecting the rectified combined exciter output current to the main generator field coil to establish the main generator magnetic field.

* * * * *